United States Patent
Schunder (10) Patent No.: US 8,185,302 B2
(45) Date of Patent: May 22, 2012

(54) CONSERVATIONAL VEHICLE ROUTING

(75) Inventor: Mark Schunder, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/868,922

(22) Filed: Aug. 26, 2010

(65) Prior Publication Data

US 2011/0166774 A1    Jul. 7, 2011

(51) Int. Cl.
*G01C 21/00* (2006.01)
*G06F 19/00* (2006.01)

(52) U.S. Cl. ........................ 701/408; 701/123

(58) Field of Classification Search ............... 701/201, 701/123, 210, 209, 202
See application file for complete search history.

(56) References Cited

U.S. PATENT DOCUMENTS

| | | | | |
|---|---|---|---|---|
| 5,578,748 A * | 11/1996 | Brehob et al. | ........... | 73/114.53 |
| 5,742,922 A * | 4/1998 | Kim | ............... | 701/201 |
| 6,005,494 A * | 12/1999 | Schramm | ........... | 340/995.19 |
| 6,484,092 B2 * | 11/2002 | Seibel | ............... | 701/209 |
| 7,369,938 B2 * | 5/2008 | Scholl | ............... | 701/207 |
| 2009/0143934 A1 * | 6/2009 | Motonaga et al. | ...... | 701/29 |
| 2009/0254266 A1 * | 10/2009 | Altrichter et al. | ....... | 701/200 |
| 2010/0010732 A1 * | 1/2010 | Hartman | ............... | 701/200 |
| 2010/0198508 A1 * | 8/2010 | Tang | ............... | 701/210 |

OTHER PUBLICATIONS http://www.rated4stars.com/html/gps-saves-gas.html.
http://www.gps.cx/index.php?c=1&n=493964&i=B001LTHONU&x=GPS_Buddy_FE01US_Fuel_Economy_Software_Package.
http://www.gpsmagaziine.com/2009/02/hands-on_with_garmins_new_ecor.php (Feb. 2009).
http://www.nrel.gov/vehiclesandfuels/vsa/pdfs/42557.pdf (Apr. 2008).
http://green.autoblog.com/2009/03/05/sentience-research-vehicle-shows-how-tons-of-data-can-save-milli/ (Mar. 2009).
http://reviews.cnet.com/8301-13746_7-10189749-48.html.
Ford Motor Company, "Navigation System: SYNC," Owner's Guide Supplement, SYNC Version 1 (Jul. 2007).
Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).
Ford Motor Company, "Navigation System: SYNC," Owner's Guide Supplement, SYNC Version 3 (Jul. 2009).
Ford Motor Company, "SYNC," Owner's Guide Supplement, SYNC Version 3 (Aug. 2009).
Kermit Whitfield, "A hitchhiker's guide to the telematics ecosystem", Automotive Design & Production, Oct. 2003, http://findarticles.com, pp. 1-3.

* cited by examiner

*Primary Examiner* — Tan Q Nguyen
(74) *Attorney, Agent, or Firm* — Jennifer M. Stec; Brooks Kushman P.C.

(57) ABSTRACT

A route-determination method includes gathering road-related data in a vehicle navigation system (VNS) for a plurality of routes between two locations. This may include weighting two or more of the possible routes in the VNS based at least on the road-related data. Also, this may include adjusting the weighting in the VNS for each weighted route based on projected fuel consumption and determining an optimal fuel usage route in the VNS based on the adjusted weighting. Further, this may include outputting at least one optimal fuel usage route.

12 Claims, 7 Drawing Sheets

CONSERVATIONAL VEHICLE ROUTING

BACKGROUND AND SUMMARY

Many drivers now have a navigation system provided as part of their vehicle, or have an aftermarket navigation system attached for use in a vehicle. These systems rely on the Global Positioning System and are generally called GPS. The map data for these systems may be pre-installed when the user purchases the system. Alternatively or additionally, map data may be periodically or dynamically provided to the systems.

In a similar system, a driver may be provided directions based on coordinates fed to an offboard location, such as, but not limited to, a server. The server may perform the vehicle direction calculations and upload the data to a vehicle system, such as the FORD SYNC system, for output to the driver.

In either of these solutions, the system in question may use map data compiled by a third party. This data, in addition to including road locations, may also include additional information, such as a speed rating for a road. The speed rating can be an exact speed or a range of speeds. For example, if the system is attempting to calculate the fastest route between points A and B, the system may analyze a variety of optional routes. Using speed data associated with each road, and the distance to be traveled on each possible road, the system will determine the fastest plausible route. Dynamic traffic data may also be available for locations to aid in this determination.

Alternatively, the system may wish to calculate the shortest route, or one that avoids certain roads, such as highways or unpaved roads. Using data associated with roads, such as classifications, the system can avoid roads of certain types. Also, using pure distances to be traveled, the system can calculate the shortest route to a location, even if it isn't the fastest route.

All of this information is useful to drivers, and can make travel easier and more efficient. As available data becomes more sophisticated, however, additional calculations may be performed.

In a first illustrative embodiment, a route-determination method includes gathering road-related data in a vehicle navigation system (VNS) for a plurality of routes between two locations. This illustrative method also includes weighting two or more of the possible routes in the VNS based at least on the road-related data.

Also, in this illustrative embodiment, the method includes adjusting the weighting in the VNS for each weighted route based on projected fuel consumption and determining an optimal fuel usage route in the VNS based on the adjusted weighting.

Finally, in this embodiment, the illustrative method includes outputting the optimal fuel usage route.

In a second illustrative embodiment, a route determination method includes receiving input to a vehicle navigation system (VNS) instructing determination of a continuous travel route. The method further includes gathering road-related data in the VNS for a plurality of routes between two locations and weighting two or more of the routes in the VNS based on the potential stopping points as indicated by the road-related data.

The method also includes selecting the route in the VNS whose weighting indicates the least likely number of stopping points. Finally, the method includes outputting, from the VNS, the selected route having the least likely number of stopping points.

In yet another illustrative embodiment, a route determination method includes determining, through a vehicle navigation system (VNS) in communication with a vehicle computing system, a low fuel condition. The method includes calculating a projected remaining travelable distance based at least in part on a remaining fuel value and locating, in the VNS, one or more refueling stations within the remaining travelable distance. Finally, the method includes providing, via the VNS, an option to re-route a travel route to include a stop at one of the one or more refueling stations.

DETAILED DESCRIPTION OF THE DRAWINGS

Figure 1:
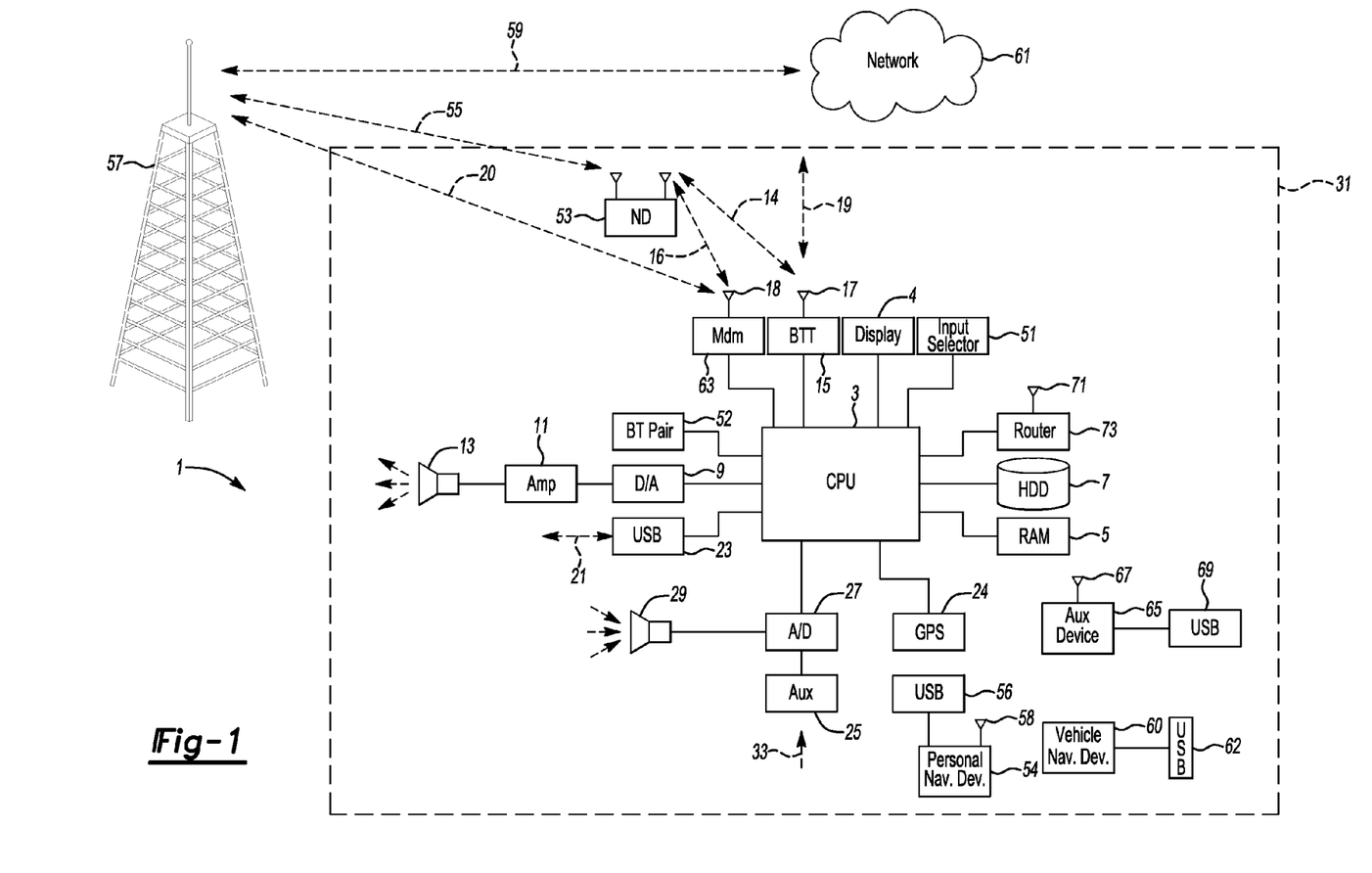
FIG. 1 shows an exemplary configuration for an illustrative vehicle computing system usable with the illustrative embodiments.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Based on additional data that may be available with current map information, or data that may be made available upon request, additional routing beyond the present methods may be performed.

The routing may be performed in conjunction with a vehicle navigation system (VNS). The VNS can include, but is not limited to, a built-in VNS or a remote VNS, such as a TOMTOM or GARMIN device. When a step is performed via the VNS, that can indicate that the VNS is acting alone, or in conjunction with another vehicle system.

Additionally, all methods taught hereby can be performed as a series of machine-operated steps, using programmed computer code stored on a machine readable storage medium. The mediums include, but are not limited to, DVDs, CDs, HDDs, RAM, ROM, and any other permanent or temporary storage media suitable for this application. Execution of the programmed computer code by the VNS and/or a vehicle computing system can cause the execution of the various methods.

Numerous scenarios arise while driving in which a route that varies from simply the "fastest" route may be desirable.

For example, hybrid cars contain systems regenerative systems that can recapture certain energy expended and turn it into stored energy for use by the vehicle. In one example, braking is regenerative in hybrid cars. Thus, if a hybrid is stuck in traffic and braking frequently, or traveling downhill, the braking during that travel may serve to recharge the batteries associated with the car.

Thus, if a driver wishes to travel on a route that may conserve energy during travel, the routing engine may calculate a route using elevation data associated with the roads. By using this data, the system can determine a route that includes one or more downhill travels, or generally decreasing elevation, in order to cause braking that will regenerate power.

In another example, a driver with or without a hybrid car, may desire to drive in the most fuel efficient manner possible. This may come, for example, from a desire to generally not waste fuel. Using vehicle data either pre-programmed or dynamically determined over the life of the vehicle, the system can determine what the most efficient route in terms of fuel consumption may be. This can be based on a variety of factors, including, but not limited to, real or projected traffic patterns, elevations, possible speeds, number of traffic lights in the path of the vehicle, etc.

Drivers may also prefer a route whereby they keep moving. For example, it is an observed phenomenon that people may prefer a route with less stopping, even if the route is longer. Stopping less frequently may also conserve fuel, as acceleration may burn a lot of fuel. Using data such as, but not limited to, projected or real traffic patterns, number of traffic lights, stop signs, etc., the system may calculate a route that involves the least amount of probable stopping.

A self-styled class of drivers called hypermilers has also arisen recently. These drivers attempt to maintain fuel efficient, constant speeds, minimizing acceleration and stopping. Using traffic light data, traffic data, road speeds etc., the system can predict a route that will likely be the most fuel conservative.

Finally, in emergency situations, such as low fuel situations, a vehicle may dynamically determine (or be told) that a fuel stop is necessary. The system can find the closest fuel location, but it may be the case that the system is at the tail end of the remaining distance available for travel based on the amount of fuel/energy remaining for use by the vehicle. It may be the case that only one route will likely allow the vehicle to reach the fuel location, and using the available data and calculations such as those mentioned above, the system may calculate one of or the only available route likely to reach the fuel location without running out of fuel. This calculation could also be done in the background, and the system could warn a driver that only a few fuel locations can be reached, in a manner similar to present low fuel warnings, but with more advanced data. The frequency and or level of the warning may also be increased as the situation grows direr.

Additionally, characteristics of a vehicle may change over time. For example, addition of aftermarket parts or changing conditions in an engine may improve or reduce fuel mileage. Accordingly, the system may choose to base estimates on a mpg number (or other fuel measure) that is measured in a some finite, recent unit of time (the last three months, weeks, etc.). Alternatively, the system can use a pre-programmed mileage, a life-of-vehicle average, or any other suitable, reasonable estimate of fuel economy. Economy can further be "guessed" based on the projected speeds of travel over portions of the route.

Figure 2:
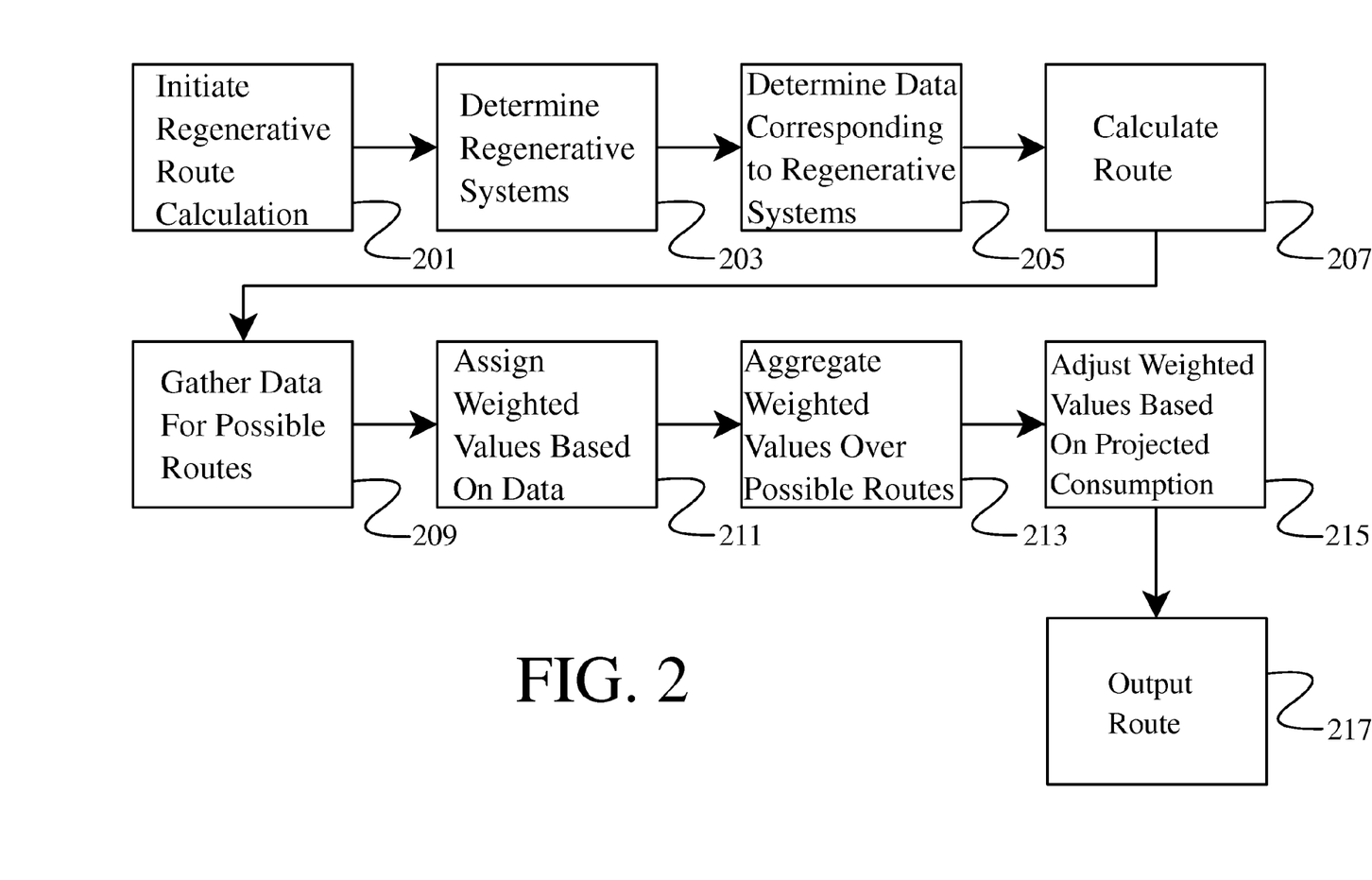
FIG. 2 shows an exemplary navigation system process for determining a route for regenerating energy.

In a first illustrative embodiment shown in FIG. 2, a navigation system determines a route for regenerating energy in a vehicle equipped with one or more regenerative systems. For example, the vehicle could be a hybrid vehicle with regenerative braking. In this instance, the system would calculate a route that might require more braking than usual (such as, but not limited to, downhill travel). Other regenerative systems are also considered, and can be incorporated into the calculations to the extent they can be triggered by a certain type of travel. If counteracting concerns cause different route calculations, the prevailing route can be chosen based on which route is likely to return the most energy. Alternatively, the quickest route that conserves/generates at least a predetermined amount of energy may be presented. An example of this type of system is shown in conjunction with FIG. 3.

In FIG. 2, the calculation system (which is referred to henceforth as a GPS, but could also include, but is not limited to, a different vehicle navigation system, a server, or another device capable of calculating directions), is instructed to provide the most regenerative route possible for a hybrid vehicle 201. In this illustrative embodiment, the system has access to vehicle specific information, either for a particular vehicle or vehicle model. In another illustrative embodiment not shown, the system may make assumptions about regenerative systems based on common systems, or have one or more inputs available for the driver to input a car type, model, and/or regenerative system.

In this embodiment, because the GPS has access to the vehicle specific information, the GPS accesses the information to determine existing regenerative systems 203. The GPS also determines which types of data correspond to each regenerative system (this information may be provided as opposed to determined) 205.

The GPS then proceeds to route calculation 207. Possible routes are calculated between the starting location and the ending location. An illustrative example of this is provided, however, the methods taught hereby can be applied to any reasonable and compatible route calculation algorithm, with the necessary modifications to the result determination.

In this embodiment, route data for possible routes is collected 209. The route data may include, for example, elevation data, possible travel speed, traffic lights, etc. Values are also associated with the route data 211, for purposes of determining the appropriate route. An aggregate value is calculated 213, in this example, wherein the highest aggregate value corresponds to the most regenerative route. Subtractions based on energy used may also be made 215, so that if a longer route produces more regeneration based on, for example, extra braking, the fuel used to travel that distance may be counter-productive to total power gain. Generally, in this example, the goal of the algorithm is to provide the most energy efficient (in terms of usage and gain) route.

The final results of the calculation are then output as the route most likely to use the least amount of fuel in the aggregate 217. This may vary from a route that simply consumes the least amount of fuel, as a route which consumes slightly more fuel may use the least amount of fuel in the aggregate due to regeneration over that route.

Figure 3:
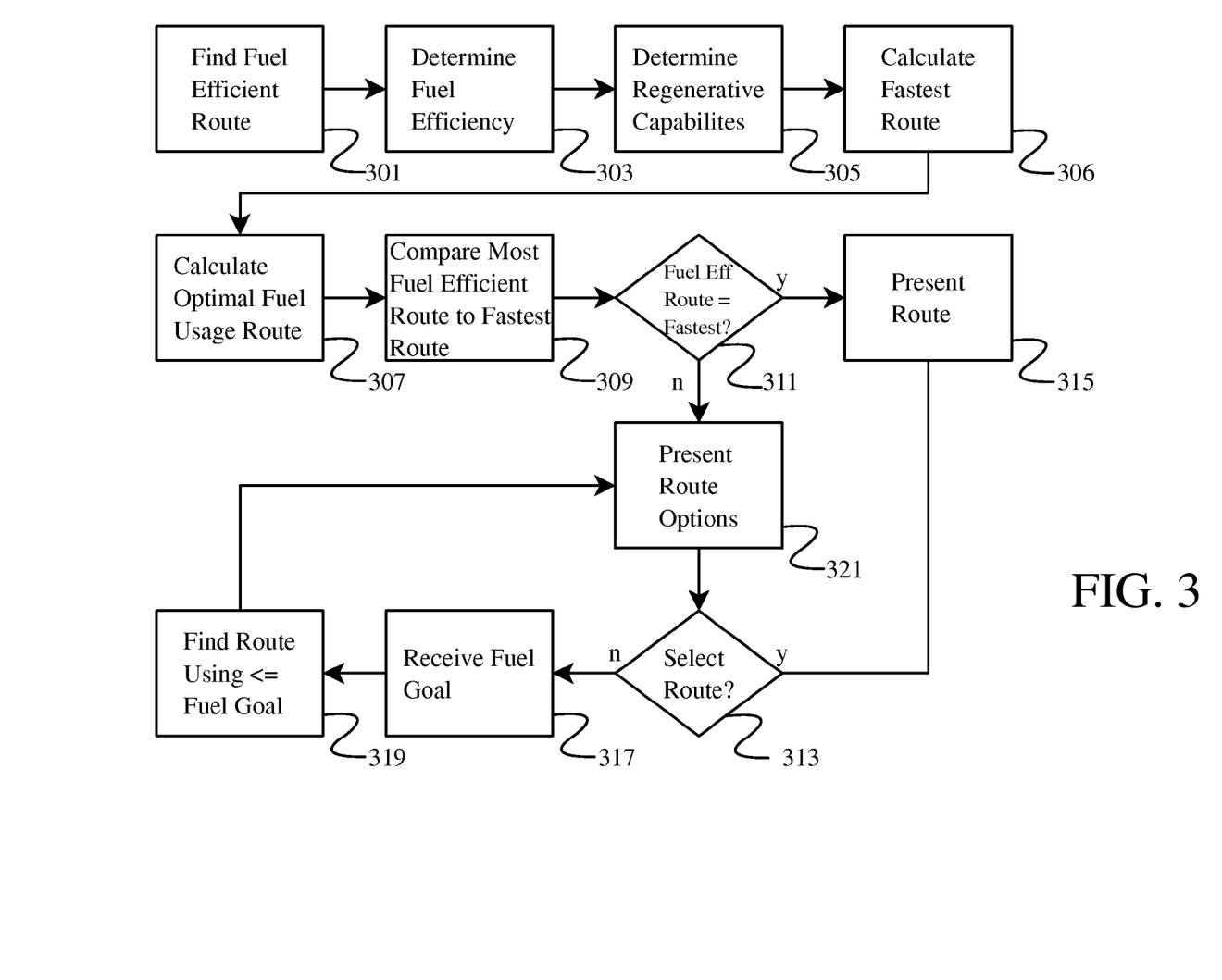
FIG. 3 shows an illustrative embodiment of a system wherein at least a predetermined amount of energy is conserved.

FIG. 3 shows an illustrative embodiment of a system wherein at least a predetermined amount of energy is conserved. For example, in a hybrid vehicle, one route may result in an MPG calculation of 24 MPG. Another route could result in a calculation of 28 MPG, but take longer. A third route could result in an efficiency of 32 MPG, but take even longer still, and use more total fuel (as used herein, the word fuel is also representative of energy, from, for example, a battery).

In one illustrative embodiment, a fuel efficient route selection is made on the GPS 301. The GPS, in this embodiment, again has access to vehicle data for the specific vehicle, so it can predictively determine fuel usage. The fuel economy data for the vehicle is accessed 303, along with the regenerative capabilities 305, if any. Using this information along with available route data, the system calculates a fastest route 306 and an optimal fuel usage route 307. The system, in this embodiment, compares the most fuel efficient route to the fastest route 309. If the most fuel efficient route is not the fastest route 311, the user is given an option to select this route 313.

If the most fuel efficient route is the fastest route, the user is presented with the route 315. If the user is presented with the option to select the route 321 and selects it, the user is also presented with the route 315.

If the user does not select this route, the user is given a target fuel usage input 317. For example, the fastest route may use a projected 5 gallons of fuel (and/or some amount of battery power) and the most efficient route may use a projected 3.5 gallons of fuel (and/or some amount of battery power). The user may have time to spare, so the user instructs the fastest route that uses no more than 4.25 gallons (projected, since unexpected conditions may occur).

Based on the input target fuel usage goal, the system may calculate the fastest route available using that goal 319 and present this as an option 321. If this is acceptable timewise, the user can select the route 313 and is presented with the route 315. If this route is not acceptable, a new route can be chosen with a lower efficiency 317.

In an alternative embodiment, the user may input a maximum travel time and be presented with the route that takes no more than that amount of time (projected) and optimizes fuel efficiency within that time period.

In a further illustrative embodiment, a fuel conservative route is determined. This is a similar route to that shown in FIG. 2, but, although the invention is not limited to this, a gasoline powered vehicle is contemplated in this example. Thus, in this particular illustrative embodiment, the factors to be considered include some factors, in a non-limiting fashion, that one might consider when conserving gasoline, and these factors may or may not vary from those to be considered when addressing a gasoline-electric or pure electric vehicle's efficiency.

Although a gasoline powered vehicle and some possible associated factors are shown by example, it is contemplated that any relevant factors for a vehicle of any power-type can be used to calculate a conservative route using this invention.

In another embodiment illustrative embodiment, a user inputs a desired fuel efficiency for a gasoline vehicle. This can be in terms of total fuel usage or miles per gallon. Generally, it is assumed that the most desirable route uses the least possible fuel, so if the user inputs, for example, 22 MPG as a target, and a route that provides 21 MPG exists that uses less total fuel, the user may be notified that a route that is more efficient in total usage is available, even though the target MPG goal has not been met.

Figure 4:
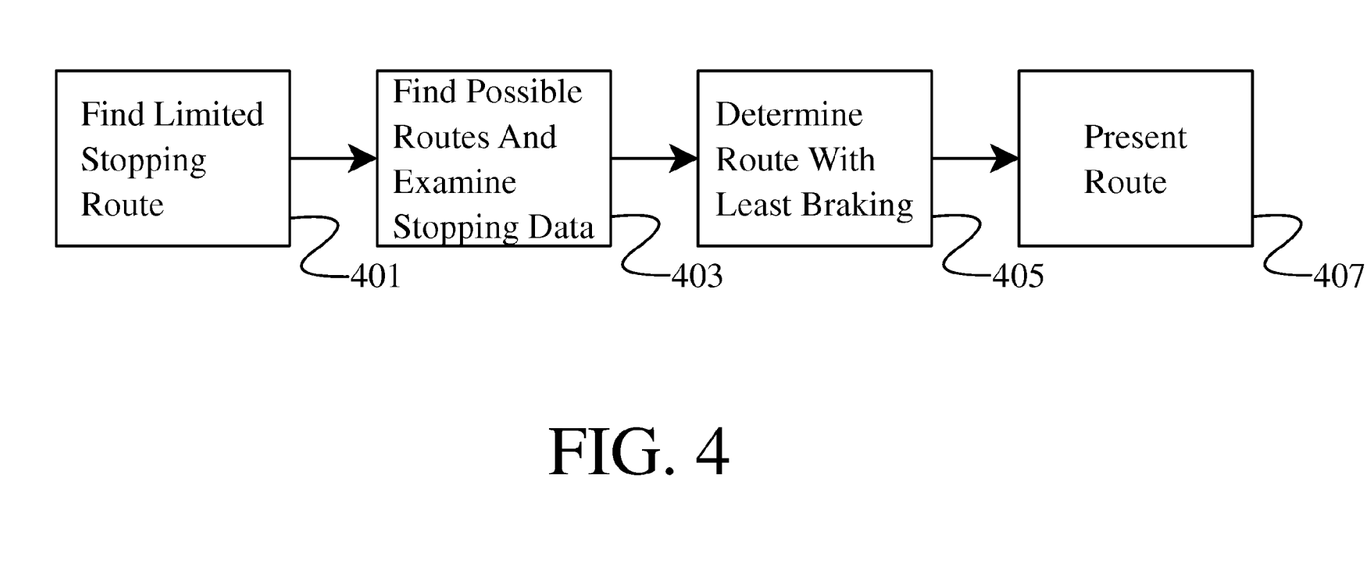
FIG. 4 shows an illustrative process for calculating a fuel conservative route.

In yet another illustrative embodiment shown in FIG. 4, a route of constant (as much as possible) motion is calculated. In this illustrative embodiment, the driver is presented with a route that is most likely to keep the vehicle in motion.

In this embodiment, the user selects an instruction to keep the vehicle in motion 401. As previously noted, some people enjoy the experience of driving more as long as the vehicle is in motion. Although a particular route may take longer, it may simply be more enjoyable to follow because there is not the constant stop and go of a faster route.

The vehicle based system then downloads or accesses the map data for routes between the vehicle's location and a desired destination 403. Based on information such as real-time traffic, projected traffic, traffic lights and/or stop signs, the vehicle system calculates the route likely to involve the least amount of stopping 405. This route is then presented to the user 407.

The calculations can be predictive in nature. For example, if the present time is 6:00 P.M. and a particular area along a route is twenty five minutes away, the GPS may predictively consider historic traffic patterns at 6:25 P.M., the projected time of arrival. Traffic lights, presumably, will not move, although system data may include information on when the lights are functioning and when the lights are flashing yellows, for example, allowing traffic to flow through. Real-time traffic patterns may also be considered, although they may have less value at initial route calculation the further along the route they are (i.e., the more time there is for them to change before the user arrives at that point).

The predictive nature of the algorithm may even grow more complex. For example, on a Saturday, traffic may normally be low at both 6:00 pm and 6:25 pm at a particular location. In this example, however, real-time traffic data may indicate heavy traffic in this area. With some or all weight given to the real-time determination, the system may use this to "predict" that the traffic will still be heavy at 6:25 P.M., despite what historic data may indicate. Using a combination of real-time data and historic data, the system can attempt to optimally predict a route. It may even be possible to determine, for example, using a combination of internet data, real-time data, and map data, that a venue along the route has an event at a particular time, indicating a likelihood of higher traffic. For example, if a person were driving past an amphitheater, the system may note this and also determine that a concert starts at 7:00 pm, adding some factor to an increased likelihood of traffic. The "smarter" the predictive algorithm, the more accurate the possible prediction may become.

In another illustrative example, the vehicle computing system may have access to weather data for the route. Accordingly, it can determine, for example, whether weather conditions are likely to affect solar energy systems on a vehicle, driving speeds, etc. Or the vehicle system could route a driver around smaller weather systems.

If the vehicle computing system had access to, for example, elevation data, and if the vehicle were equipped with, for example, at least one solar energy system for which the computing system also knew the orientation, then the system could even go so far as to attempt to route the vehicle towards changing elevation routes (or flat routes, depending on the time of day) that were most likely to keep the solar energy system aimed at the sun.

Figure 5:
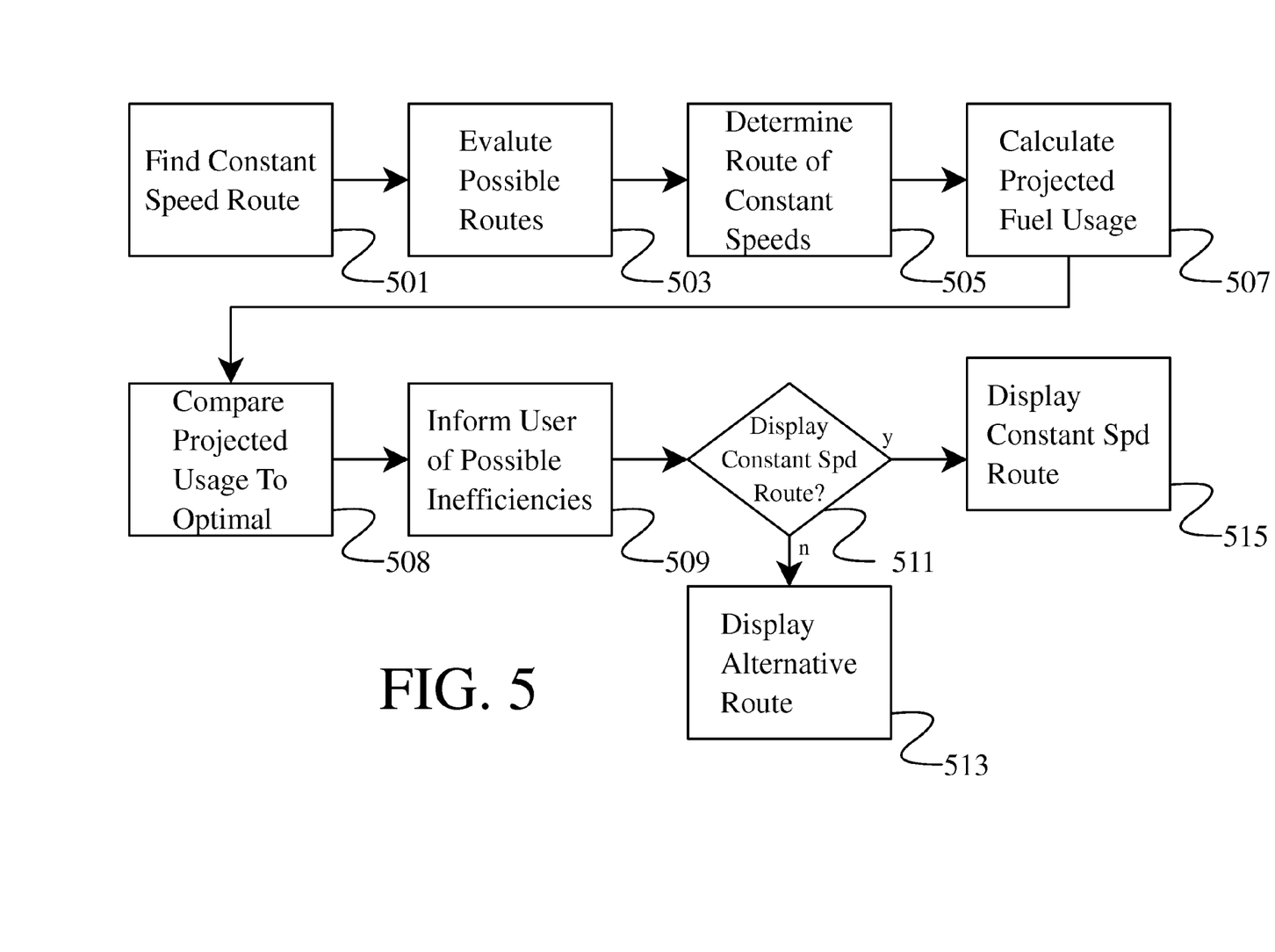
FIG. 5 shows an exemplary process for determining a route of constant speed.

In still another illustrative embodiment, shown in FIG. 5, a route of constant speed is calculated. This route might be useful, for example, for a hypermiler. This route attempts to provide the fewest likely points of acceleration, and may also include the use of elevation data to provide a relatively downhill route.

A driver may wish to implement their own techniques for fuel efficiency that a vehicle may or may not be able to calculate. For example, one technique used by hypermilers is drafting, or driving somewhat closely behind another vehicle to lower the wind resistance (improving fuel efficiency) against their own vehicle. Since it is highly unlikely that a GPS can tell a driver where to find a vehicle behind which to draft, the driver may desire a route where a constant speed can most likely be maintained, and then the driver can implement additional techniques. Of course, if such data was available, it could be implemented into a calculation.

In this illustrative embodiment, the user instructs the GPS to determine a route of constant speed 501. The GPS then calculates possible routes 503. In this calculation, the GPS determines the route that has the fewest speed changes 505. Of course, as with other implementations, projected fuel usage for this route 507 can also be calculated and compared to other routes 508 and the driver can be informed of possible inefficiencies 509. If the driver still desires the presented route, 511, the route is presented 515. It may be the case that the driver knows that an extra few miles per gallon can be eked out of the vehicle based on implemented techniques, so the driver may still desire a route that the GPS projects to be less fuel efficient than an alternative route.

Otherwise, the projected fuel or time optimal route may be displayed 513, in this example.

In an alternative embodiment, the driver can input a number of variables for a GPS to consider when calculating an "efficient" route. This could allow the driver to add some additional considerations based on what that driver determines produces the most efficient route.

Figure 6A:
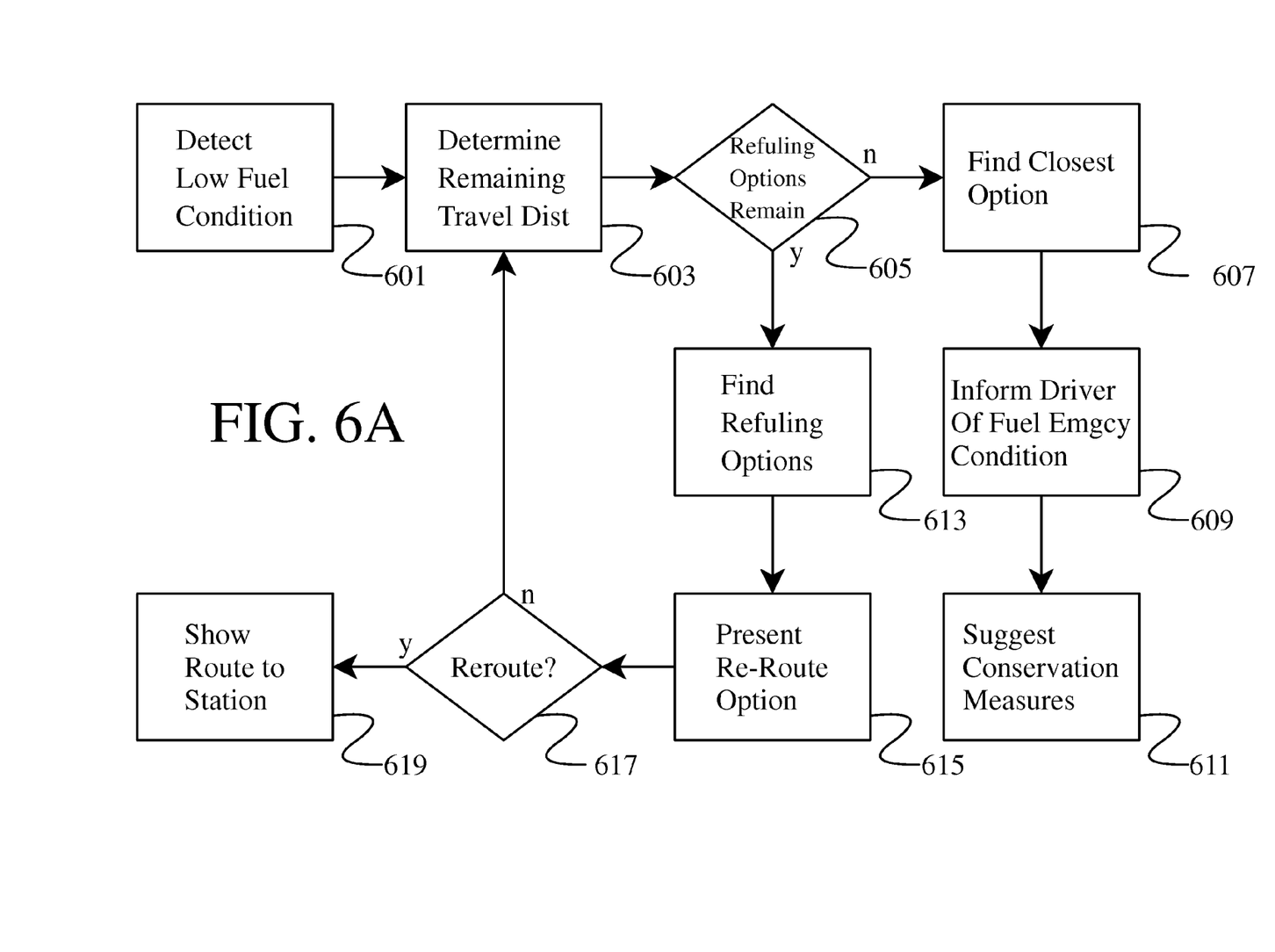
FIGS. 6A and 6B show exemplary processes for emergency warning systems are shown.
Figure 6B:
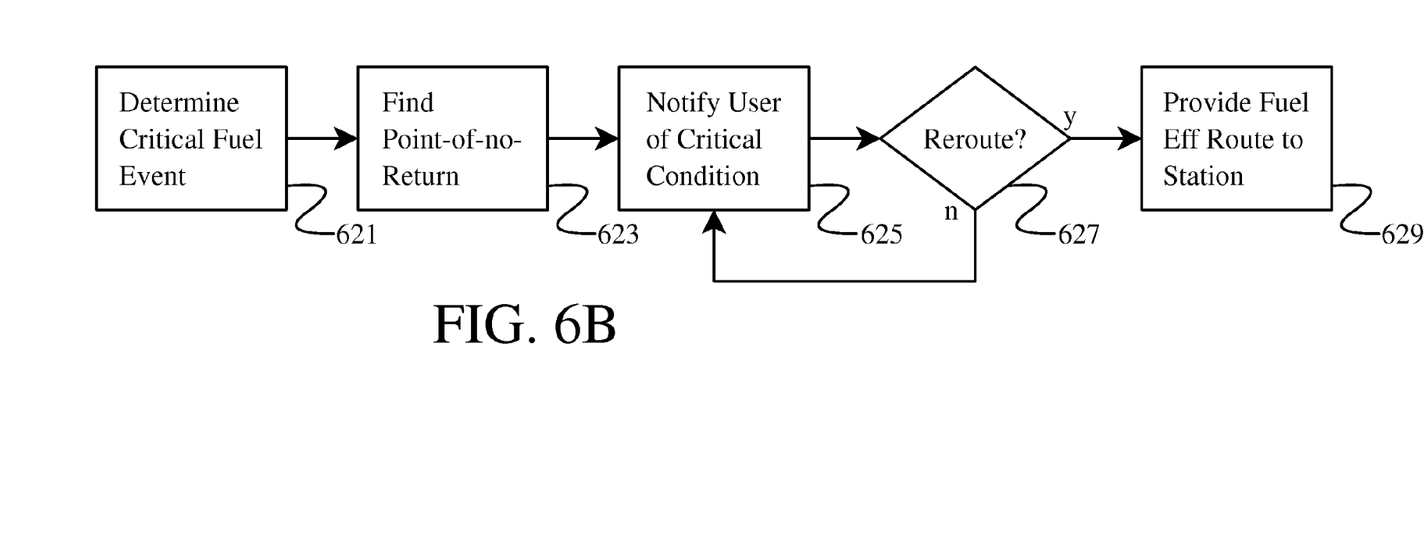

In further illustrative embodiments, shown in FIGS. 6A and 6B, emergency warning systems are shown. In these illustrative systems, a low fuel condition is detected. In the exemplary embodiment shown in FIG. 6A, the system determines the fastest route to the most convenient service station that is within a travelable range based on remaining fuel. In FIG. 6B, the system dynamically calculates how many service stations can be reached based on remaining fuel, and if certain conditions are met, warns the driver of an impending point-of-no-return (e.g., when a fuel station can no longer likely be reached). The system may even be sophisticated enough to act in a predictive manner, whereby it warns the driver that if an upcoming turn is not made, no more fueling points will likely be available. This can allow the driver to decide to turn before a point-of-no-return is passed, as opposed to the system noticing that the point has been passed and then notifying the driver, when it may be too late.

In FIG. 6A, a refueling calculation is triggered by a low fuel determination 601 (this event could also correspond to a user requesting a refueling stop). Once the low fuel determination is made, the GPS determines how far the vehicle may travel based on the remaining fuel 603. The system then accesses map data, to determine if one or more fuel locations is within the projected remaining distance 605. If no fuel locations remain, the system may find the closest fuel location and notify the driver if it is likely the station is reachable 607, if it is possible the station is reachable, etc. If the station is just outside of range 609, the driver may take (or be instructed to take), steps to conserve fuel, such as turning off air-conditioning and/or other unnecessary systems 611.

If multiple locations are available, the system may make a determination 613 based on, but not limited to, closest location, closest location along route, etc. The system then presents an option to re-route to the refueling station 615. If the driver does not re-route 617, the system can continue to calculate routes to stations based on remaining fuel and presenting options to the driver. Or the route to the nearest/most convenient station can be displayed 619.

In FIG. 6B, the system has reached a critical point. It has calculated that only one refueling station remains 621 within range of the vehicle. Additionally or alternatively, it predictively determines that traveling past a point along the current directions will place the vehicle out of range of refueling stations 623.

A user is notified 625 of a critical condition. The system may automatically re-route 627, or it may give the user a repeating warning, that persists until the new route is selected 629.

Using all of the techniques taught herein, predictive modeling can be used to improve the driving experience. Routing systems and increasingly complex data can also be applied in creative manners to provide a variety of options to a driver that were not previously available. This may result in a more eco-friendly and/or pleasant driving experience.

Although the invention is described with reference to illustrative embodiments, these are intended as examples only, and are not intended to limit the scope of the invention to the embodiments disclosed.

What is claimed is:

1. A method comprising:
   gathering data in a vehicle navigation system (VNS) for a plurality of routes between two locations;
   weighting two or more possible routes in the VNS based at least on the data;
   adjusting the weighting in the VNS for each weighted route based on projected fuel consumption;
   determining an optimal fuel usage route in the VNS based on the adjusted weighting;
   correlating one or more elements of the data to one or more energy generating systems associated with a vehicle, wherein the weighting is based at least in part on an indication, based on the data, that favorable conditions for energy generation occur over a portion or all of the possible route; and
   outputting at least one optimal fuel usage route.

2. The method of claim 1, wherein the energy generating systems include at least a regenerative braking system or a solar power generator.

3. The method of claim 2, wherein at least one element of the data includes elevation data and the elevation data is correlated with the regenerative braking system.

4. The method of claim 2, wherein at least one element of the data includes stop sign data and the stop sign data is correlated with the regenerative braking system.

5. The method of claim 2, wherein at least one element of the data includes traffic light data and the traffic light data is correlated with the regenerative braking system.

6. The method of claim 2, wherein at least one element of the data includes traffic data and the traffic data is correlated with the regenerative braking system.

7. A computing system for a vehicle comprising:
   a processor in communication with at least one memory location, the memory location having instructions that configure the processor to:
   gather data in a vehicle navigation system (VNS) for a plurality of routes between two locations;
   weight two or more possible routes in the VNS based at least on the data;
   adjust the weighting in the VNS for each weighted route based on projected fuel consumption;
   determine an optimal fuel usage route in the VNS based on the adjusted weighting;
   correlate one or more elements of the data to one or more energy generating systems associated with a vehicle, wherein the weighting is based at least in part on an indication, based on the data, that favorable conditions for energy generation occur over a portion or all of the possible route; and
   output at least one optimal fuel usage route.

8. The system of claim 7, wherein the energy generating systems include at least a regenerative braking system or a solar power generator.

9. The system of claim 8, wherein at least one element of the data includes elevation data and the elevation data is correlated with the regenerative braking system.

10. The system of claim 8, wherein at least one element of the data includes stop sign data and the stop sign data is correlated with the regenerative braking system.

11. The system of claim 8, wherein at least one element of the data includes traffic light data and the traffic light data is correlated with the regenerative braking system.

12. The system of claim 8, wherein at least one element of the data includes traffic data and the traffic data is correlated with the regenerative braking system.

* * * * *